United States Patent [19]
Young

[11] 3,855,591
[45] Dec. 17, 1974

[54] SHADOW ANTENNA

[76] Inventor: David W. Young, 627 N. Beachwood Dr., Burbank, Calif. 91506

[22] Filed: Apr. 27, 1973

[21] Appl. No.: 355,019

[52] U.S. Cl............. 343/5 LS, 343/108 SM
[51] Int. Cl................................. G01s 9/02
[58] Field of Search 343/5 LS, 5 EM, 6 TV, 108 SM

[56] References Cited
UNITED STATES PATENTS

| | | | |
|---|---|---|---|
| 2,426,184 | 8/1947 | Deloraine et al. | 343/108 SM |
| 3,053,932 | 9/1962 | Worst | 343/6 TV |
| 3,136,999 | 6/1964 | Schreffler | 343/108 SM |
| 3,204,237 | 8/1965 | Overcash | 343/5 LS X |
| 3,716,860 | 2/1973 | Bechtel | 343/5 LS X |

OTHER PUBLICATIONS

IRE Transactions – Aeronautical and Navigational Electronics, Sept. 1955, pp. 22–25.

*Primary Examiner*—Malcolm F. Hubler
*Attorney, Agent, or Firm*—Pastoriza & Kelly

[57] ABSTRACT

A method and antenna means is provided for establishing a precision elevation relationship to facilitate piloting an aircraft. Essentially, a radar antenna is positioned on the aircraft at a location such that a physical portion of the aircraft itself intercepts part of the radar beam when the beam is directed towards the ground or towards a runway to thereby cast a shadow of such portion. In this respect, the physical portion of the aircraft causing the shadow essentially constitutes part of the antenna itself. The resulting radar picture from the antenna on a screen in the pilot's cockpit will display the shadow relative to the ground or runway and the relative relationship of the shadow to the ground or runway establishes an elevation relationship on the radar screen for the pilot.

7 Claims, 3 Drawing Figures

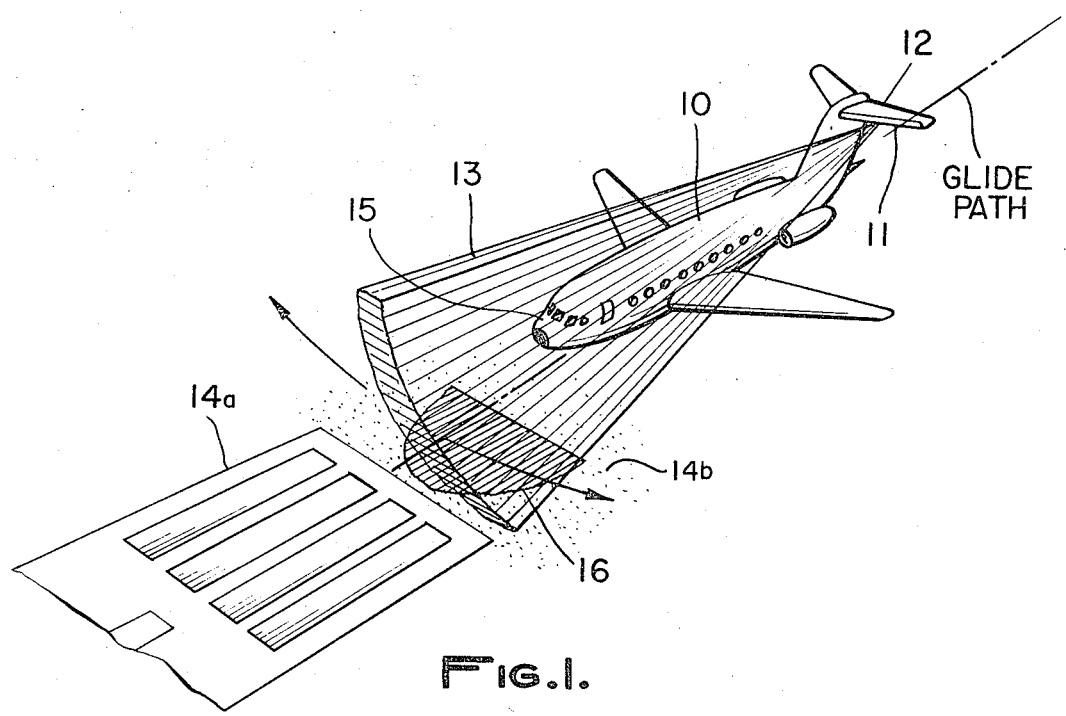
Fig.1.
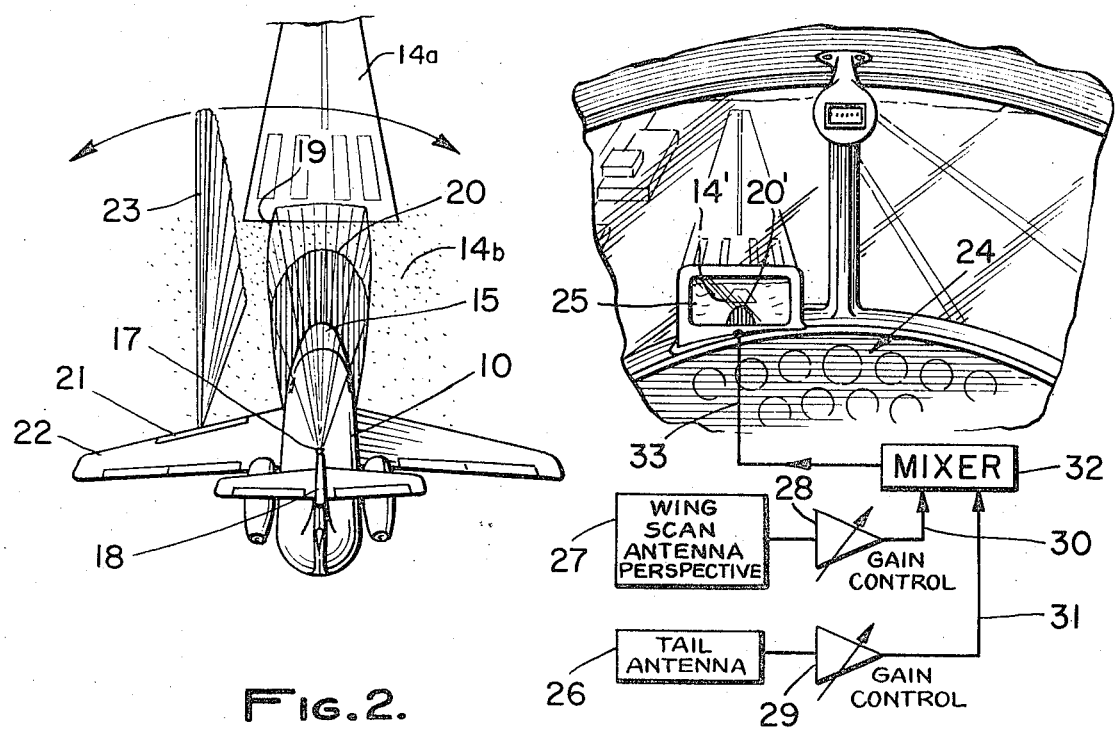
Fig.2.
Fig.3.

SHADOW ANTENNA

This invention relates generally to aircraft contained radar and more particularly to a novel antenna arrangement to establish on a radar screen in the pilot's cockpit an elevation relationship useful to the pilot in maneuvering the aircraft.

BACKGROUND OF THE INVENTION

A serious problem in both private and commercial aircraft involves landing the aircraft during periods of poor visibility. In cases where the airport is not equipped with ground control approach systems, the pilot must rely on his airborne instruments and his own capabilities in landing the aircraft.

The foregoing problem has been overcome to a substantial extent by the provision of a perspective radar display contained wholly within the aircraft and not depending in any way on the ground instruments. Such a perspective radar display system is fully disclosed and described in my copending patent application Ser. No. 847,121 filed Aug. 4, 1969 and entitled AIRCRAFT CONTAINED PERSPECTIVE RADAR/DISPLAY AND GUIDANCE FOR APPROACH AND LANDING, now U.S. Pat. 3,778,821 issued Dec. 11, 1973. Further improvements in such perspective radar systems particularly relating to the antenna structures is set forth and described in my later filed copending patent application Ser. No. 353,201 filed Apr. 20, 1973 and entitled RIDGE SCAN ANTENNA.

Even with these airborne radar systems, the situation is still not as satisfactory as would be the case if the pilot had good visibility in landing. In fact, if a pilot could control his aircraft from a position exterior of the aircraft where he could readily observe a portion of the aircraft relative to the ground or a runway, he could effect a greatly improved degree of control. For example, if the pilot were on the exterior of the aircraft where he could observe the relation of the aircraft to the ground he would be able to increase his judgement skill as to the elevation relationship of the aircraft.

BRIEF DESCRIPTION OF THE PRESENT INVENTION

With the foregoing in mind, the present invention contemplates a unique method and antenna arrangement for establishing an elevation relationship which is provided directly on a radar screen in the cockpit in such a manner as to greatly facilitate the piloting of an aircraft over the ground or in the event of a landing, along a precision glide path.

Essentially, the method and antenna system simulate a condition where a pilot might actually be exterior of the aircraft observing the elevation of the aircraft relative to the ground or runway.

Briefly, the method of the invention includes the steps of positioning a radar antenna on the aircraft at a location such that a physical portion of the aircraft itself intercepts part of the radar beam when the beam is directed towards the runway to thereby cast a shadow of such physical portion. The resulting radar picture from the antenna is then displayed on a screen in the pilot's cockpit so that the pilot can visually observe the resulting elevation relationship of the shadow relative to the outlines of the runway. With this visual image, the pilot can then maneuver the aircraft to maintain the observed shadow in a known elevation relationship to the runway as the aircraft approaches the runway corresponding, for example, to that relationship which results when the aircraft is on a precision glide path. Thus the pilot maintains the aircraft altitude essentially constant and adjusts the power to keep the aircraft on the glide path.

Since radar is used, bad weather or dark conditions are irrelevant insofar as the display is concerned.

A suitable antenna arrangement for carrying out the method includes by way of example mounting an antenna on the uppermost portion of the aircraft tail so that the beam will be intercepted by a part of the forward body portion of the aircraft and thus cast a shadow on the ground area towards which the radar beam is directed. The pilot will then see the shadow as well as the ground objects picked up by the radar such as the outlines of a runway. The invention also contemplates the provision of such a tail mounted antenna in combination with a perspective radar scanning antenna such as shown and described in the referred to copending applications. The signal from each of these antennas can be combined in a mixer and displayed on the same screen. By providing individual gain adjustments for the signals, the shadow can be caused to fade out or become prominent relative to the scanning radar signal.

BRIEF DESCRIPTION OF THE DRAWINGS

A better understanding of the invention will be had by referring to the accompanying drawings in which:

FIG. 1 is a perspective view of an aircraft approaching a runway provided with an antenna arrangement for carrying out the method of the invention;

FIG. 2 is another perspective view looking from the rear of an aircraft showing a modified form of the invention; and, FIG. 3 is a block diagram including a fragmentary showing of the cockpit in the aircraft of FIG. 2 useful in explaining the operation of the invention.

DETAILED DESCRIPTION OF THE INVENTION

Referring first to FIG. 1 there is shown an aircraft 10 provided with a radar antenna 11 which may be incorporated in the leading edge of the aircraft tail 12.

The antenna 11 itself may take the form of an elongated wave guide of the type described in my heretofore referred to copending application which will radiate a fan shape beam 13 which can be scanned in azimuth back and forth as indicated by the arrows.

As shown, the tail constitutes a means for the particular aircraft disclosed for mounting the antenna on the exterior of the aircraft in a position such that a physical portion of the aircraft itself intercepts a part of the beam when the beam is directed generally towards the ground or towards a runway and runway area such as indicated at 14a and 14b. As shown in FIG. 1, the physical portion of the aircraft intercepting part of the beam constitutes the nose 15 and the effective shadow is illustrated at 16 short of the runway 14a.

Essentially, the scanning antenna beam will provide a display on a radar screen in the pilot's cockpit of the ground area scanned. However, the portion of the beam intercepted or blocked by the nose 15 of the aircraft does not reach the ground and thus there will in essence appear to be a shadow as described at 16 visible on the radar screen. This shadow will appear to have extremely sharp outlines due to the very large effective antenna reflector formed by the entire nose of the aircraft and the large area of the ground which is blocked from the scanning pulsed radar beam. The resulting picture on the radar screen in the cockpit would be similar to that which a pilot would see if he were sitting on the tail of the aircraft. The presence of the shadow essentially establishes an elevation reference for the pilot as well as a reference as to the angular orientation of the aircraft.

The foregoing data is extremely useful in enabling the pilot to maneuver the aircraft along a precision glide path. For example, in approaching the runway 14 the path in FIG. 1 is indicated by the dashed line labelled GLIDE PATH.

In utilizing the antenna arrangement described to aid in maneuvering the aircraft along a desired glide path, it will be evident that the size and orientation of the shadow 16 relative to the outline of the runway 14 as viewed on the radar screen will have a given relationship when the aircraft follows the correct glide path. Knowing such relationship, it is easy for the pilot to maneuver his aircraft in the manner to position the shadow 16 relative to the runway outline 14 in a manner to match that specific relationship which results when the aircraft is on the correct or precision glide path.

It should be understood that while the nose 15 of the aircraft has been described as that portion of the aircraft intercepting the radar beam to provide a shadow, any other physical portion of the aircraft could be used such as a nose wheel, wing mounted wheel, hub of the propeller mount, or even a specially designed blade or projection for providing a reference shadow. In essence, the physical part of the airplane intercepting the radar beam constitutes part of the overall antenna.

Referring now to FIG. 2 there is shown the aircraft 10 mounted with two basic radar antennas. One of these antennas indicated at 17 may be located in the topmost portion in the center of the tail 18 and need not be a scanning antenna but simply an antenna providing a beam which spreads sufficiently to cover a given area of ground upon which a shadow may be cast by a physical portion of the aircraft. In the embodiment of FIG. 2, the nose 15 of the aircraft is again used as a reference shadow, the beam from the antenna 17 being indicated at 19 and the effectively created shadow on the runway 14 being indicated at 20.

In conjunction with the shadow antenna mounted on the tail, there is also provided an additional radar antenna operating independently of the tail antenna providing a perspective radar picture. This additional antenna is of the scanning beam type such as described in FIG. 1 in the tail 12 and as also set forth and described in my heretofore referred to copending applications.

The fan shaped scanning beam from the antenna 21 is shown at 23 in FIG. 2 and is swept in azimuth to cover the same general ground area towards which the beam from the tail mounted antenna is directed. However, the mounting of the additional scanning antenna 21 is spaced in a different physical position from the tail antenna so that no substantial physical portion of the aircraft which might cast a shadow intercepts the scanning beam 23.

Referring to FIG. 3, there is shown in fragmentary view the interior 24 of a cockpit which includes a radar display screen 25. Signals from the tail antenna 17 and the scanning antenna 21 are received in first and second receivers 26 and 27 respectively, these receivers including gain control means 28 and 29 to provide first and second output signals on leads 30 and 31 connected to a mixer 32. The mixer combines the signals for display on the radar screen 25 as by lead 33.

On the screen 25 the shadow 20 of FIG. 2 and the outline of the runway 14 are indicated by the numerals 20' and 14' respectively.

With the arrangement described in FIGS. 2 and 3, it is possible by adjustment of the gain controls 28 and 29 to cause the shadow 20' appearing on the radar screen to be gradually faded out or brought into prominence relative to the overall picture provided by the scanning beam. Thus the system incorporating the two antennas of FIG. 2 permits the tail mounted or shadow antenna to be of a substantially simpler construction and one which need not require a narrow beam and narrow pulse width; that is, the tail antenna need not be a high resolution antenna. The necessary high resolution of the ground or runway area being surveyed is provided by the scanning antenna and pulse width upon which the signals from the shadow antenna are super-imposed in the radar screen 25.

In the FIG. 1 embodiment described, the single antenna in the high crossed T-type of tail such as is characteristic of the commercial Douglas DC-9 aircraft serves both to provide a perspective radar view of the runway as well as the shadow of the nose of the aircraft to aid the pilot in maneuvering the craft along a desired path.

From the foregoing description, it will thus be evident that the present invention has provided a very simple and economical means of providing a ready elevation reference for the aircraft which may be utilized for determining a precision glide path for the aircraft. Moreover, and as mentioned heretofore, the relative orientation of the shadow provides angular information to a pilot.

The method and antenna arrangement is particularly useful in very large aircraft where the position of the pilot in the cockpit does not reveal portions of the plane which he can use to line up with the runway when he is landing the plane. It effectively provides a reference which the pilot would not otherwise have unless he were sitting on the tail of the plane itself or on some exterior portion where he could properly relate the orientation of the plane relative to the ground or the runway.

While the shadow may be used with plan position indicator type radar displays or other radar displays, it has unique advantages when used with a perspective radar as described. Indeed, when used with a perspective radar system, the shadow effect can be used to confirm the altitude of the aircraft with respect to the airport area or can actually be used to measure such altitude.

With respect to the foregoing, assuming the set-in altitude is correct, the shadow on the perspective radar screen does not change with the altitude during approach, although the size of the runway relative to the shadow does change and is indicative of approach progress or range. However, if the set-in altitude is in error, for example, too high or too low, the shadow appears elongated, or contracted, on the screen, respectively. The pilot is thus made aware of an incorrect altitude setting in his perspective radar and resets the set-in altitude until the shadow is no longer distorted. This setting then gives him the correct altitude.

Further, with the perspective radar and shadow, any reasonable glide slope may be naturally interpolated by knowing the specific angle of the shadow which typically would be six degrees. For example, for a three degree approach with a dix degree shadow, the pilot positions the aircraft to present the runway threshold one half way between the horizon and shadow to locate the aircraft on a three degree glide slope.

In the combining of the shadow and perspective radar signals as described in FIG. 3, it should be understood that the respective signals may be distinguished by color as well as by relative intensity.

I claim:

1. A method of establishing an elevation relationship to facilitate piloting an aircraft approaching a runway along a precision glide path without the necessity of any ground control approach systems comprising the steps of:
   a. positioning a radar antenna on the aircraft at a location such that a physical portion of the aircraft itself intercepts part of the radar beam when the beam is directed towards the runway to thereby cast a shadow of said portion;
   b. displaying the resulting radar picture from the antenna on a screen in the pilot's cockpit so that the pilot can visually observe the resulting elevation relationship of the shadow relative to the outline of the runway; and,
   c. maneuvering the aircraft to maintain the observed shadow in a known elevation relationship to the runway as the aircraft approaches the runway corresponding to that relationship which results when the aircraft is on said precision glide path, whereby a wholly self-contained system on the aircraft provides the resulting elevational relationship.

2. An aircraft radar antenna means for displaying an elevation relationship to the pilot of the aircraft without the necessity of any ground control approach systems comprising, in combination:
   a. a radar antenna for directing a radar beam from the aircraft towards the ground;
   b. means mounting the antenna on the exterior of the aircraft in a position such that a physical portion of the aircraft itself intercepts a part of the radar beam to thereby cast a shadow of the portion on the ground; and
   c. a radar display screen in the pilot's cockpit for displaying the resulting radar picture from the antenna, the position of the shadow relative to the ground as displayed on the screen establishing said elevation relationship, whereby a wholly self-contained system on the aircraft establishes the resulting elevational relationship.

3. An aircraft radar antenna means for displaying an elevation relationship to the pilot of the aircraft comprising, in combination: a radar antenna for directing a radar beam from the aircraft towards the ground; means mounting the antenna on the exterior of the aircraft in a position such that a physical portion of the aircraft itself intercepts a part of the radar beam to thereby cast a shadow of the portion on the ground; a radar display screen in the pilot's cockpit for displaying the resulting radar picture from the antenna, the position of the shadow relative to the ground as displayed on the screen establishing said elevation relationship; an additional radar antenna operating independently of said first mentioned antenna providing a perspective radar picture, said additional antenna radiating a scanning beam from the aircraft which is swept across the same general area of ground towards which the beam of said first mentioned antenna is directed, the additional antenna being mounted on the aircraft in a different position from the first mentioned antenna so that no substantial physical portion of the aircraft which might cast a shadow intercepts the scanning beam; first and second receivers for the first mentioned and additional antenna signals respectively; mixer means connected to receive and combine the output signals from the first and second receivers and pass the combined signals to said radar display screen; and control means for distinguishing the output signals on said screen from each other.

4. An antenna according to claim 3, in which said control means constitutes gain controls on each of said receivers so that the relative intensities of the output signals displayed on said screen can be controlled whereby the shadow displayed on the screen can be faded out or brought into prominence relative to the overall picture provided by the scanning beam of said additional antenna.

5. An antenna according to claim 3, in which the position of the shadow on said screen relative to the display of the runway threshold on the perspective radar provides an indication of the desired precision glide slope angle to thereby enable the pilot to maintain the aircraft on the correct glide slope.

6. An antenna according to claim 3, in which the shape of the shadow as displayed on the perspective radar screen indicates any error in the set-in altitude in the perspective radar.

7. An antenna according to claim 3, in which the relative size of the runway to the shadow as observed on the perspective radar indicates the approach progress or range of the aircraft with respect to the runway.

* * * * *